United States Patent [19]
Akishita et al.

[11] Patent Number: 5,932,801
[45] Date of Patent: Aug. 3, 1999

[54] FAILURE DIAGNOSIS SYSTEM FOR AUTOMOBILE ENGINE

[75] Inventors: Sadao Akishita, Shiga-ken; Ziye Li, Joetsu; Toshihiko Kato, Shiga-ken, all of Japan

[73] Assignee: Daifuku Co., Ltd., Osaka, Japan

[21] Appl. No.: 09/081,247

[22] Filed: May 19, 1998

[30] Foreign Application Priority Data

May 23, 1997 [JP] Japan .................................... 9-132671
May 18, 1998 [JP] Japan .................................... 10-134115

[51] Int. Cl.[6] .................................................. G01M 17/00
[52] U.S. Cl. ................................ 73/116; 73/660; 701/111
[58] Field of Search .......................... 73/660, 116, 117.2, 73/117.3, 118.1; 701/111, 35

[56] References Cited

U.S. PATENT DOCUMENTS

| | | | |
|---|---|---|---|
| 4,730,484 | 3/1988 | Olschefski | 73/660 |
| 4,843,885 | 7/1989 | Bambara | 73/660 |
| 4,884,449 | 12/1989 | Nishimoto et al. | 73/660 |
| 5,109,700 | 5/1992 | Hicho | 73/660 |
| 5,390,545 | 2/1995 | Doan | 73/660 |
| 5,445,027 | 8/1995 | Zörner | 73/660 |
| 5,487,008 | 1/1996 | Ribbens et al. | 73/660 |
| 5,574,646 | 11/1996 | Kawasaki et al. | 73/660 |
| 5,719,791 | 2/1998 | Neumeier et al. | 73/660 |

*Primary Examiner*—George Dombroske
*Attorney, Agent, or Firm*—Reising, Ethington, Barnes, Kisselle, Learman & McCulloch PC

[57] ABSTRACT

A failure diagnosis system for automobile engines comprises an inverter motor (6) connected to a rotary shaft of an engine to be measured (2) and intended to rotate the engine (2), a microphone (8) for detecting an engine sound of the engine to be measured (2), a digital tape recorder for recording therein the engine sound detected by the microphone and an engine failure detector for extracting characteristics of the engine sound from the engine sound recorded in the recorder by a wavelet transform so as to detect a failure of the engine by the characteristics of the engine sound.

3 Claims, 7 Drawing Sheets

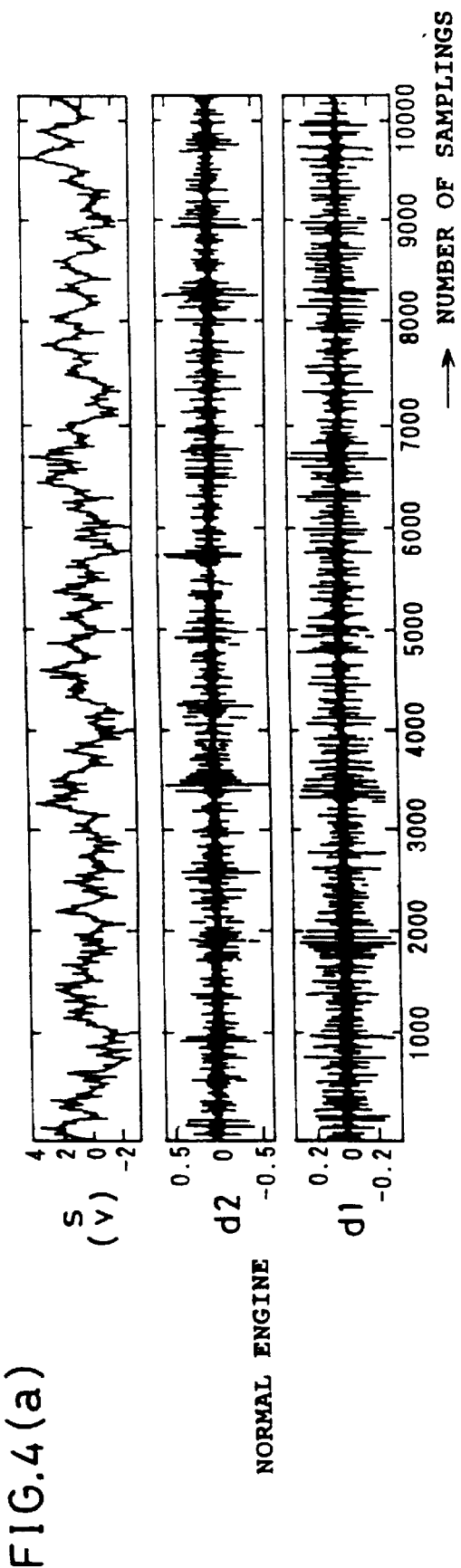
FIG.4(a) NORMAL ENGINE
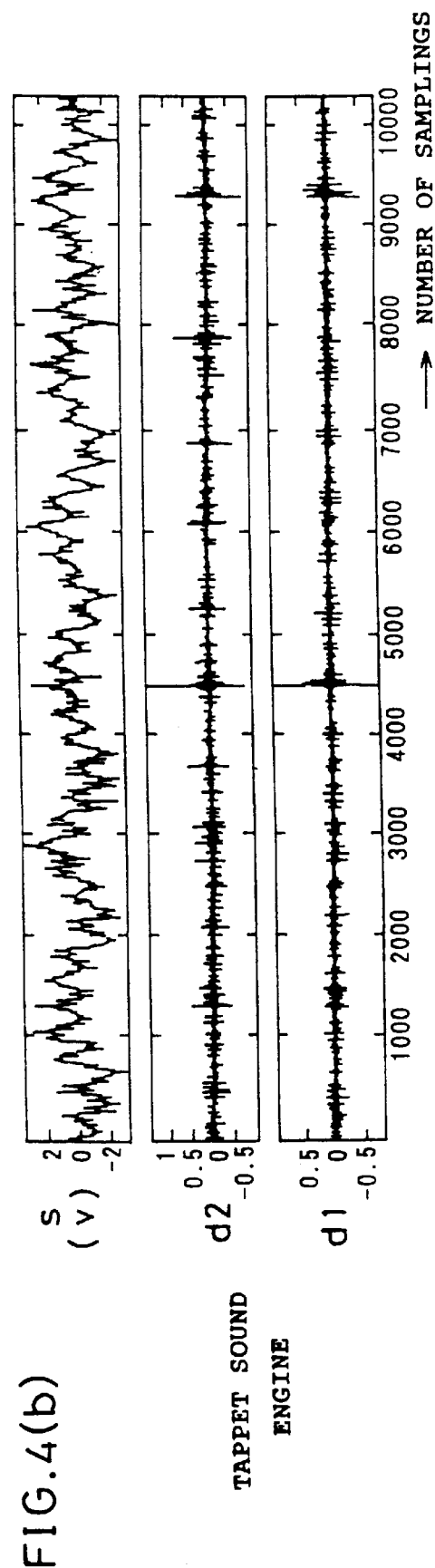
FIG.4(b) TAPPET SOUND ENGINE

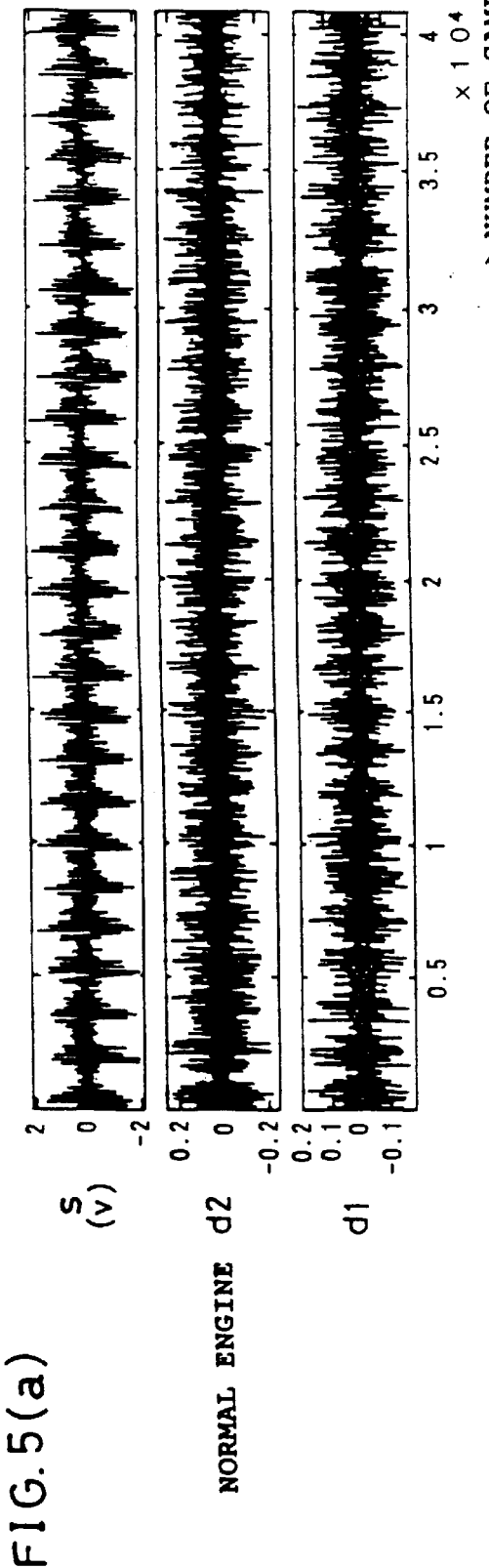
FIG.5(a) NORMAL ENGINE
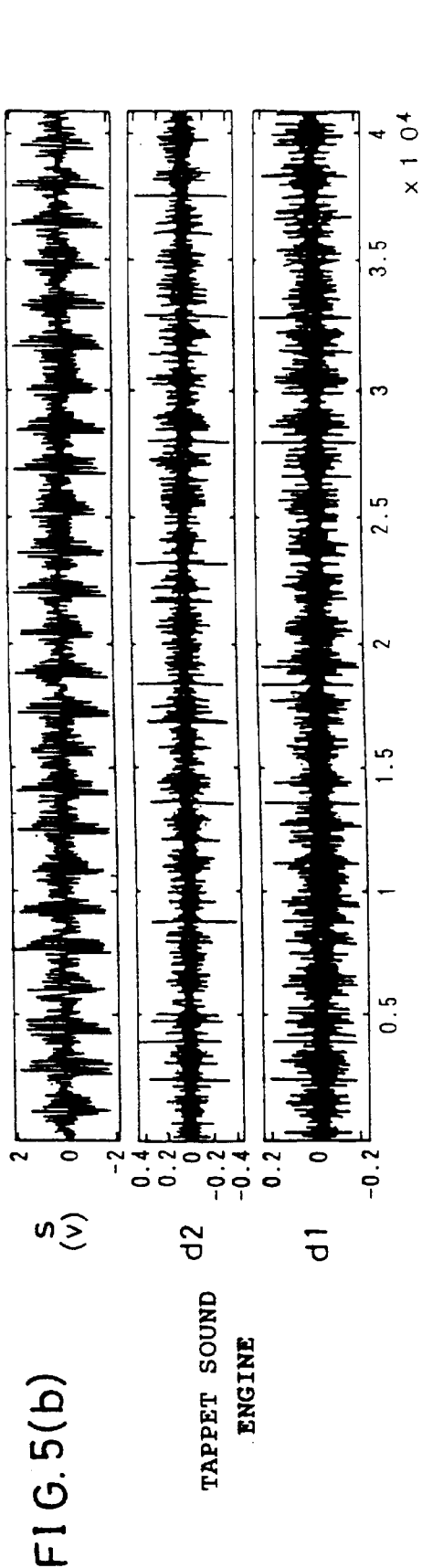
FIG.5(b) TAPPET SOUND ENGINE

NORMAL ENGINE

TAPPET SOUND ENGINE

FAILURE DIAGNOSIS SYSTEM FOR AUTOMOBILE ENGINE

BACKGROUND OF THE INVENTION

1. Field of the Invention

The present invention relates to a failure diagnosis system for automobile engines which is used in a vehicle production process when performing a performance test on an engine before the same is assembled onto a vehicle body. Particularly, the invention concerns an equipment for determining the goodness or badness of the engine according to the sound or vibration thereof.

2. Description of the Related Art

A known failure diagnosis system for automobile engines has been disclosed in, for example, Japanese Patent Application Laid-Open Publication No. Hei 4-242138.

In this known failure diagnosis system for automobile engines, determination of whether the engine is good or bad is made by actually driving the engine before the same is assembled onto the vehicle body, namely by supplying water, fuel and electricity to the engine and thereby actually performing the engine operation by firing. The determination (evaluation) of a failure of the engine sound in this failure diagnosis system for automobile engines is made by maintaining the rotations number of the engine operated by firing to be fixed, extracting the sound of the engine by a microphone, frequency analyzing the engine sound extracted by the microphone, and detecting the frequency of the engine sound that exceeds a threshold value.

However, in the method of determining a failure of the engine by actually firing-operating the above-described known engine, since actual abnormal sounds of the engine are hidden by the suction sound and exhaust sound (combination sound) as well as the noises of the factories near the engine and the noises such as the another-engine operation sound, ventilation equipment sound (fan rotation sound, air blowing sound, etc.), etc. there is the problem that difficulties arise in automatically extracting characteristics of the engine sound through frequency analyses and quantifying it. Also, since the firing-operation of the engine is impossible to execute unless the assembly thereof is complete, there is the problem that many steps and a significantly large amount of time are needed for repairing the engine after abnormalities have been found out.

SUMMARY OF THE INVENTION

To attain the above object, according to the present invention, there is provided a failure diagnosis system for automobile engines comprising a drive unit connected to a rotary shaft of an engine to be measured and rotating the engine, sound detecting means for detecting the sound of the engine to be detected, recording means for recording an engine sound detection signal of the sound detecting means, and an engine failure detector for extracting characteristics of the engine sound from the engine sound detection signal recorded in the recording means by a wavelet transform so as to detect a failure of the engine by the characteristics of the engine sound.

According to the above-described construction, non-firing operation (motoring) for rotating the engine by the drive unit is performed in place of the known firing-operation, whereby the noises such as the combustion sound of the engine are abated, with the result that the engine sound detection signal detected by the sound detecting means is recorded. The automobile engines of the engine sound is extracted from this recorded engine sound detection signal by the wavelet transform, and the failure of the engine is determined by this automobile engines of the engine sound.

BRIEF DESCRIPTION OF THE DRAWINGS

FIGS. 4a and 4b illustrate the characteristics of the engine sounds of the failure diagnosis system for automobile engines;

FIGS. 5a and 5b illustrate the characteristic of the engine sounds of the failure diagnosis system for automobile engines;

DETAILED DESCRIPTION OF THE PREFERRED EMBODIMENTS

Embodiments of the present invention will now be explained with reference to the drawings.

Figure 1:
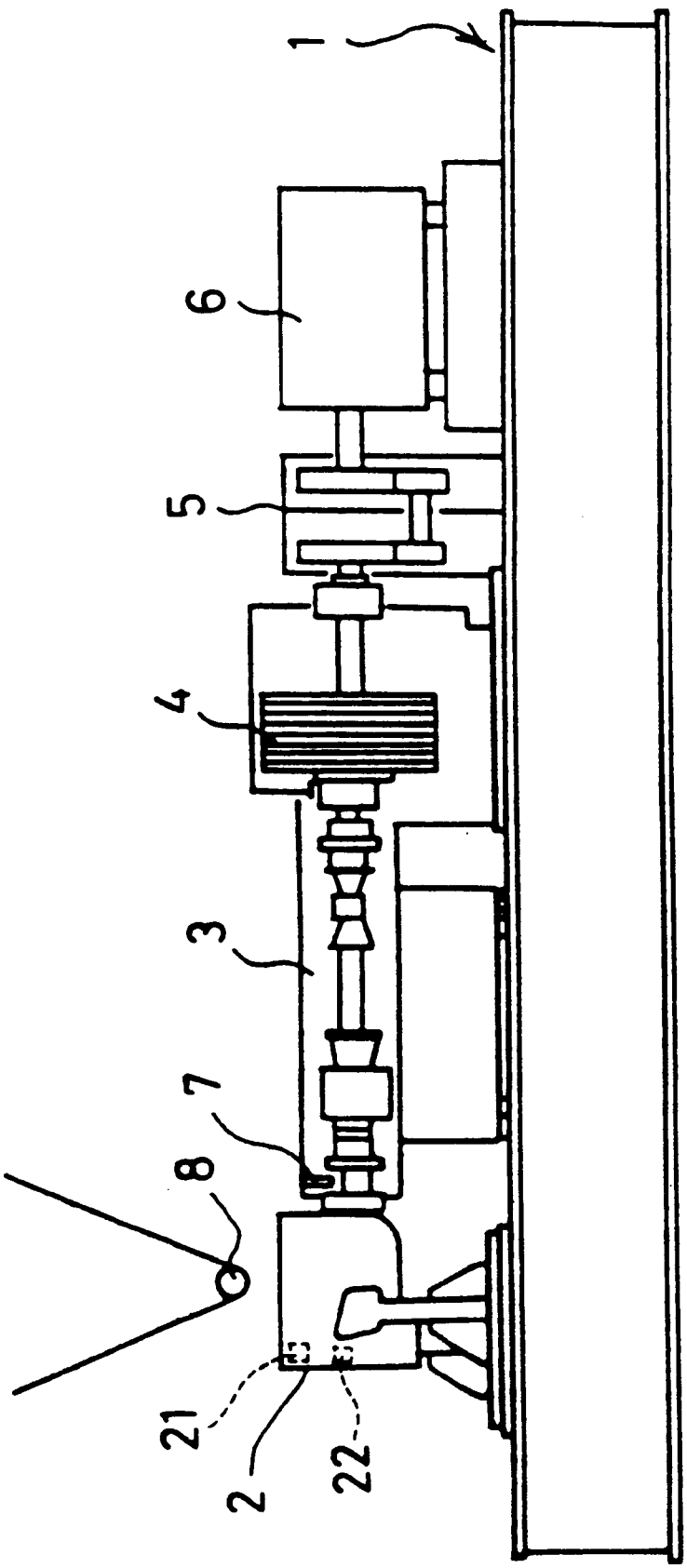
FIG. 1 is a schematic constructional view illustrating a failure diagnosis system for automobile engines according to an embodiment of the present invention.

FIG. 1 is a schematic constructional view illustrating a failure diagnosis system for automobile engines according to an embodiment of the present invention.

In FIG. 1, a reference numeral 1 denotes a bench of an engine 2. To a rotary shaft of the engine 2 placed on this test bench 1 there is connected a rotary shaft of a flywheel 4 through a connector device 3. A rotary shaft of an inverter motor 6 is connected to the rotary shaft of this flywheel 4 through a reduction gearing 5. Through the drive of the inverter motor 6, the engine 2 is rotated whereby non-firing operation of the engine 2 is performed. The rotations number of the engine 2 is controlled by a computer (not illustrated) on the test bench 1.

Figure 2:
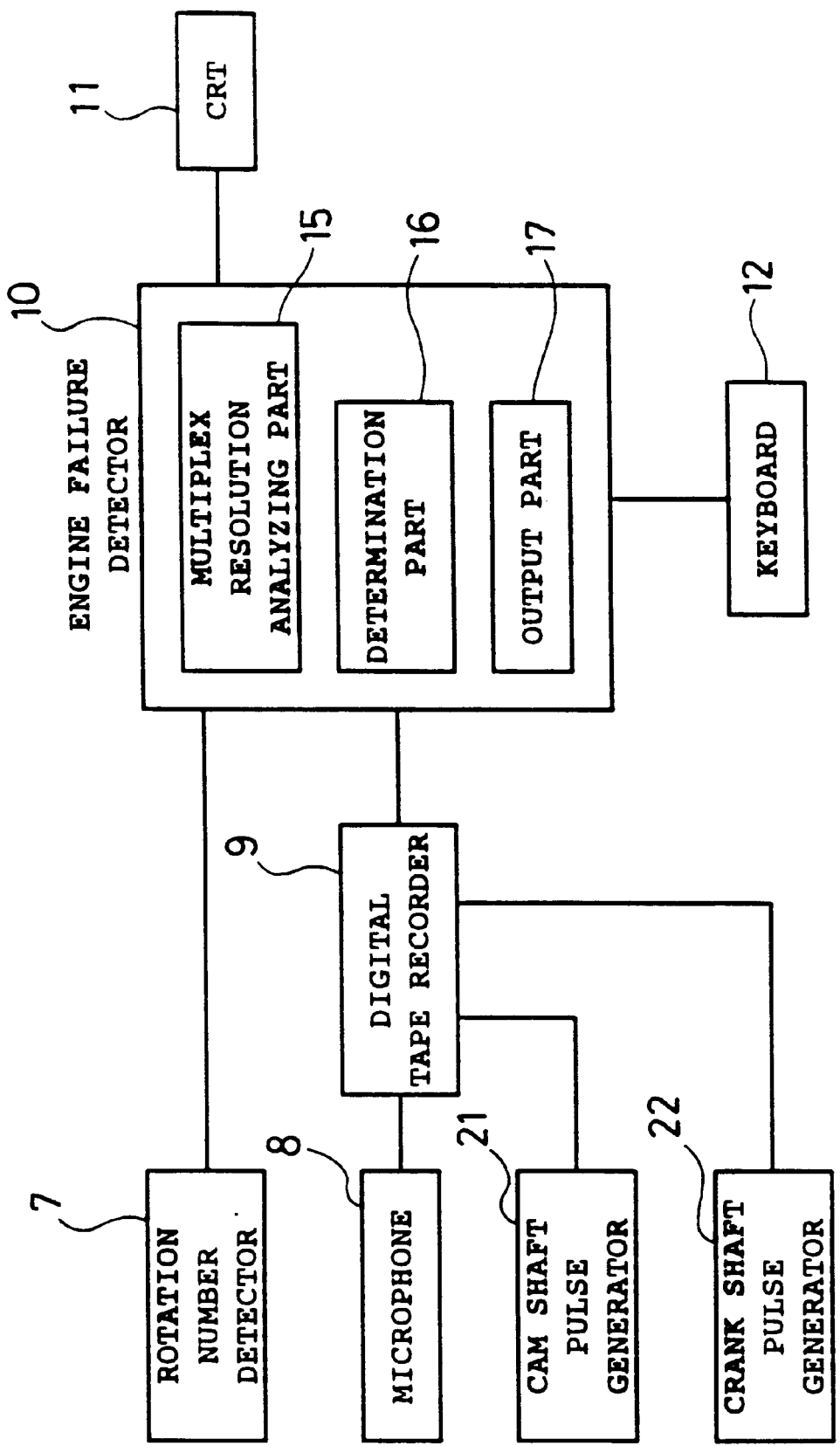
FIG. 2 is a main part block diagram illustrating the failure diagnosis system for automobile engines.

Also, in FIG. 1, a reference numeral 7 denotes a rotation-number detector for detecting the number of rotations of the engine 2. A reference numeral 8 denotes a microphone (one example of the sound detecting means) which is suspended from above the engine 2 and intended to detect the sounds of the engine 2 and its ambient area. As illustrated in FIG. 2, the engine sound detection signal of this microphone 8 is recorded in a digital tape recorder 9. The engine sound detection signal of the microphone 8 covering a prescribed time length (for example, a 20-second time length), which has been recorded in this digital tape recorder 9, is input to an engine failure detector 10 that contains a microcomputer. By this failure detector 10, the engine sound is determined whether or not including a failure for each prescribed number of rotations of the engine 2 detected by the rotation-number detector 7. The determination result is displayed on a CRT 11. A reference numeral 12 denotes a keyboard for performing various settings with respect to the engine failure detector 10.

Also, in FIG. 1, a reference numeral 21 denotes a cam-shaft pulse generator which consists essentially of an electromagnetic pickup. The cam-shaft pulse generator 21 detects a protrusion of a member to be detected which is connected to a cam shaft of the engine 2 so as to output a pulse. A reference numeral 22 denotes a crank-shaft pulse generator which consists essentially of an electromagnetic pickup. The crank-shaft pulse generator 22 detects a tooth of a gear connected to the crank shaft of the engine so as to output a pulse. The cam-shaft pulse signal of the cam-shaft pulse generator 21 and the crank-shaft pulse signal of the crank-shaft pulse generator 22 are recorded in the digital tape recorder 9 simultaneously with the engine sound detection signal. The cam-shaft pulse signal and crank-shaft pulse signal covering a prescribed time length (for example, a 20-second time length), which have been recorded in the digital tape recorder 9, are input to the engine failure detector 10.

The above mentioned member to be detected is formed thereon, for example, with one protrusion at a position that corresponds to a cam-shaft angle of 0°, with two protrusions at a position that corresponds to a cam-shaft angle of 120° and with one protrusion at a position that corresponds to a cam-shaft angle of 240°. When this member is detected, a 1-pulse waveform signal is output when the cam-shaft angle is 0°, a 2-pulse waveform signal when the cam-shaft angle is 120°, and a 1-pulse waveform when the cam-shaft angle is 240°, respectively as the cam-shaft pulse detection signal.

Also, one tooth is provided for each 1° crank-shaft angle (359 teeth in total). As the crank-shaft pulse signal, a 1-pulse waveform signal is output for each 1° crank-shaft angle. By counting this pulse signal by a counter, the angle of the crank shaft is detected. If the crank shaft has previously been at the 0°-angular position, the counter is set at 0°. Thereafter, each time the counter counts 360 pulses, it is reset back to 0°.

The engine failure detector 10 comprises a multiplex resolution analyzing part 15 performing analysis on the basis of wavelet transform, a determination part 16 determining the result of an analysis performed by the analyzing part 15, and an output part 17 outputting the analyzed result and determination result to the CRT 11.

The multiplex resolution analyzing method that is executed by the multiplex resolution analyzing part 15 on the basis of the wavelet transform will now be explained.

The wavelet transform based on the mother wavelet $\psi(x)$ of the function $f(x)$ is defined as expressed in the equation (1).

$$(W\psi f')(b, a) = \int_{-\infty}^{\infty} \frac{1}{\sqrt{|a|}} \psi\left(\frac{x-b}{a}\right) f(x) \tag{1}$$

where a (/=0) and b represent the parameters that respectively represent the scale transform and the shift transform. Discretizing the coordinate (b, 1/a) by whole numbers j and k and writing the wavelet transform $(W\psi f)$ $(2^{-j}k, 2^{-j})$ as $d_k^{(j)}$ with the scale constant being set as 2, the equation (1) becomes $$d_k^{(j)} = 2^j \int_{-\infty}^{\infty} \psi(2^j x - k) f(x) dx \tag{2}$$

The inverse transform is given as $$f(x) = \sum_j \sum_k d_k^{(j)} \psi(2^j x - k) \tag{3}$$

The following definition is given.

$$g_j(x) = \sum_k d_k^{(j)} \psi(2^j x - k) \tag{4}$$

Also, the equation (3) is written as follows.

$$f_j(x) = g_{j-1}(x) + g_{j-2}(x) + \tag{5}$$

where j is termed as the level.

The equation (5) can be rewritten in a recursive form regarding $f_j(x)$ as follows.

$$f_j(x) = g_{j-1}(x) + f_{j-1}(x) \tag{6}$$

Using a scaling function $\Phi(x)$ the $f_j(x)$ can be expressed in a linear join form.

$$f_j(x) = \sum_k C_k^{(j)} \phi(2^j x - k) \tag{7}$$

The $\psi$ in the equation (4) and the $\Phi$ in the equation (7) are the same in all levels j. Therefore, the decomposition of $f_j(x)$ is in the actual procedure to determine factors $C_k^{(j-1)}$ and $d_k^{(j-1)}$ from the coefficient $C_k^{(j)}$ of the equation (7). The algorithm for this decomposition is expressed as the following equation.

$$C_k^{(j-1)} = \frac{1}{2}\sum_L g_{2k-L} C_L^{(j)} \tag{8}$$

$$d_k^{(j-1)} = \frac{1}{2}\sum_L h_{2k-L} C_L^{(j)}$$

Figure 3:
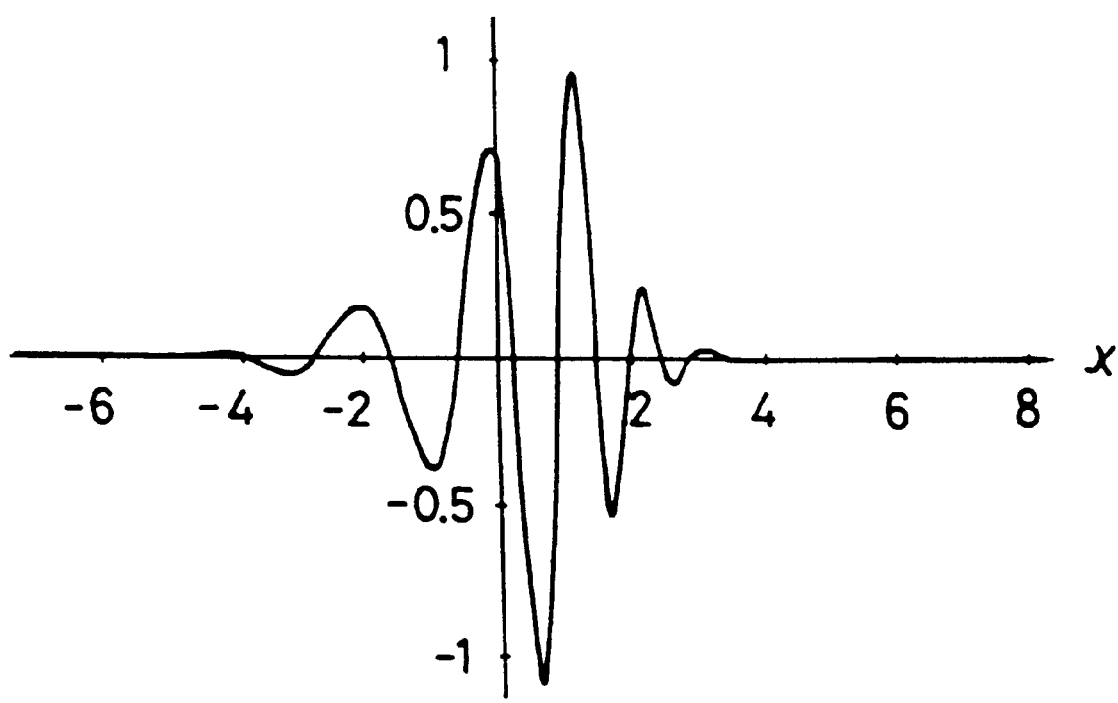
FIG. 3 is a wavelet function graph of the failure diagnosis system for automobile engines.

The decomposed series $\{g_k\}$ and $\{j_k\}$ have been obtained from the wavelet of Daubechies (N=8). The form of the mother wavelet function is illustrated in FIG. 3.

In the engine 2, a normal state and an abnormal state (the state where the tappet sound of the engine 2 was generated) were prepared, whereby the sounds in the respective states were measured. The tappet sound is generated by thinning the shim between the one suction valve lifter and the cam. On the test bench 1 measurement was performed for each number of rotations and the time frequency was analyzed using the wavelet of the Daubechies (N=8).

Green signals (volt) of a normal and an abnormal engine that are generated when the engine 2 makes 500 rotations, the expansion factors (wavelet factor) d1(high frequency band) of the wavelet transform and the wavelet factor d2(d1 * ½ frequency band) of the wavelet transform are illustrated in FIGS. 4a and 4b and FIGS. 5a and 5b. FIGS. 4a and 4b illustrate the characteristics of the engine when sound isolation has been executed and FIGS. 5a and 5b illustrate the characteristics of the engine sound when no sound isolation has been executed. These signals are displayed on the CRT 11.

It is to be noted that when no sound isolation has been executed, for eliminating the effect of the noises and vibrations of a factory, three given samples of each expansion factor d1, d2 of the wavelet transform are averaged (with the frame of the wavelet analysis being set as 218 ms, a 654 ms signal is analyzed three discrete times and the analyzed result is simply averaged).

Impulse-like components appeared on the expansion factors d1 and d2 of the wavelet transform. This is considered to be due to the fact that discontinuous changes in the original signal waveforms have been sensitively caught by the orthogonality of the Daubechies wavelet. With regard to other numbers of rotations, too, the same result was obtained.

The determination part 16 for the analyzed result determines that an abnormality (generation of the tappet sound) exists when the part 16 has been found out that the impulse-like components that are peculiar to the expansion factors d1 and d2 of the wavelet transform, and outputs the determination result to the output part 17 to display it on the CRT 11.

As illustrated in FIGS. 5a and 5b, when no sound isolation had been executed, namely also from the engine sound contaminated by, for example, the noises and vibrations of a factory, the generation of the tappet sound could be detected.

In the above-described verification the "tappet sound" was detected and, in addition thereto, the "cam-gear sound", "timing belt (chain) sound", "V-belt sound" and "idle speed control valve suction sound" could be detected as the engine sound or noise sound.

Also, when the "tappet sound" is detected, it is possible to detect which cylinder suction valve or exhaust valve is generating the tappet sound.

Figure 6A:
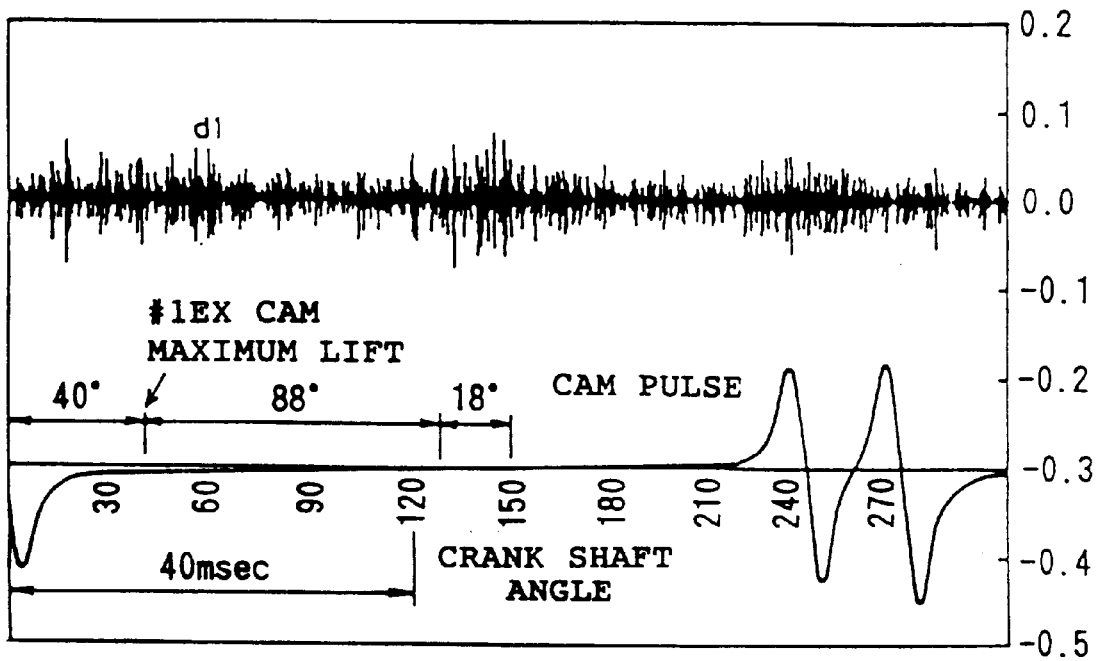
FIGS. 6a and 6b illustrate the characteristics of the engine sounds relative to the rotation angle of a crank shaft in the failure diagnosis system for automobile engines.
Figure 6B:
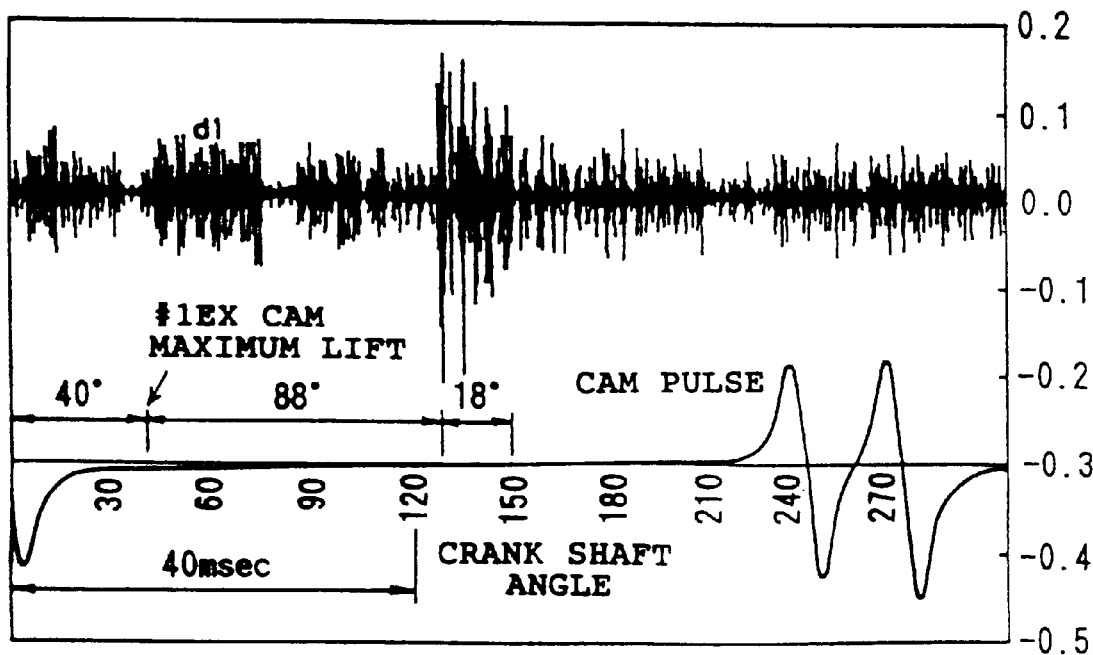

In the engine 2, a normal state and an abnormal state (a state where the tappet sound is generated from the exhaust valve of the first cylinder of the engine 2) were prepared and the sound, cam-shaft pulse and crank-shaft pulse (rotation angle) were measured each in the respective states. FIGS. 6a and 6b illustrate the characteristics of the expansion factor d1 of the wavelet transform of the engine sound (wavelet factor), the cam-shaft pulse signal and the crank-shaft rotation angle, each in the respective normal and abnormal states.

With regard to the cam-shaft pulse signals, since two pulse waveforms are successively detected where the cam angle is 120°, the cam angle of 120° is detected by detecting these two successive pulses waveforms. Since the crank shaft makes two rotations while the cam shaft makes one rotation, it is understood that when the two pulse waveforms have been detected, the,rotation of the crank shaft is the first one (the rotation angle of the crank shaft is approximately 240°). In FIGS. 6a and 6b, the rotation angle of the crank shaft detected by counting the cam shaft pulses is overlapped by the simultaneously detected wavelet factor d1 of the wavelet transform of the engine sound.

When having found out the impulse-like components peculiar to the expansion factor d1 of the wavelet transform, the determination part 16 for the analyzed result determines that an abnormality (generation of the tappet sound) exists. Also, since the operation of the suction valve and exhaust valve of each cylinder are known beforehand according to the rotation angle of the crank shaft, the determination part 16 determines that the tappet sound is being generated from the exhaust valve of the first cylinder of the engine 2 due to the fact that the tappet sound is being generated when the crank shaft is at a rotation angle of from 128° to 146°. The determination part 16 outputs to the output part 17 the determination result of "generation of the tappet sound from the exhaust valve of the first cylinder" thereby to display the result on the CRT 11.

In this way, the failure diagnosis of the sound of the engine 2 can be determined by the non-firing operation (motoring) instead of by the known firing operation. Accordingly, in the mid-course of the assembly of the engine 2, the failure diagnosis can be determined, which can decrease the repairing step and the time of finding out an abnormality. Also, it is considered that the detection ability has more been enhanced because of the presence of no explosion sound of the engine 2. Further, by simultaneous detection of the rotation angle of the crank shaft, it is possible to particularize the valve of the cylinder from which the tappet sound is being generated and therefore to quickly repair when an abnormality has been found out.

Incidentally, the determination result of the determination part 16 is not only displayed but also can be output to a higher-order computer.

Figure 7:
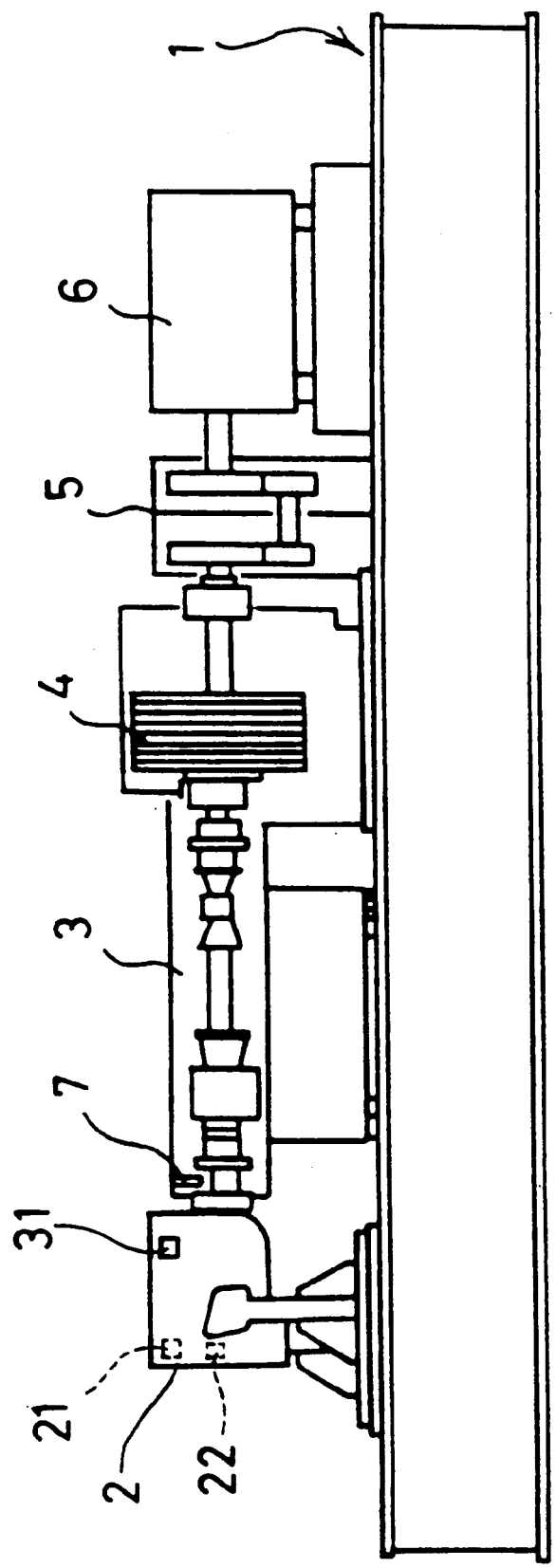
FIG. 7 is a schematic constructional view illustrating a failure diagnosis system for automobile engines according to another embodiment of the present invention.

Although the failure of the engine 2 has been detected by the sound thereof in the above-described embodiment, it is also possible to make the failure diagnosis of the engine 2 by the vibration thereof. In this case, as illustrated in FIG. 7, in place of the microphone 8, an acceleration sensor 31 is mounted on the surface of the engine 2 as a vibration sensor. During a non-firing operation, the detection signal from this acceleration sensor 31 is recorded in the digital tape recorder 9. And, in like manner as in the case with the engine sound, the detection signal of the acceleration sensor 31 is analyzed on the basis of wavelet. If a peculiar component is found out, it is so determined that there exists an abnormality.

What is claimed is:

1. A failure diagnosis system for automobile engines comprising:

a drive unit connected to a rotary shaft of an engine to be measured and rotating the engine;

sound detecting means for detecting the sound of the engine to be measured;

first rotation angle detecting means for detecting the rotation angle of a crank shaft of the engine to be measured;

second rotation angle detecting means for detecting the rotation angle of a cam shaft of the engine to be measured;

recording means for recording an engine sound detection signal of the sound detecting means and the rotation angles of the crank shaft detected by the first rotation angle detecting means and the cam shaft detected by the second rotation angle detecting means; and an engine failure detector for extracting a tappet sound of the engine from the engine sound detection signal recorded in the recording means by a wavelet transform such that any plural number of samples of the expansion factors of the wavelet transform are averaged, thereby detecting a cylinder valve at which an abnormality has occurred by the rotation angles of the crank shaft and the cam shaft obtained when the tappet sound of the engine has been extracted.

2. A failure diagnosis system for automobile engines comprising:

a drive unit connected to a rotary shaft of an engine to be measured and rotating the engine;

vibration detecting means for detecting the vibration of the engine to be measured;

first rotation angle detecting means for detecting the rotation angle of a crank shaft of the engine to be measured;

second rotation angle detecting means for detecting the rotation angle of a cam shaft of the engine to be measured;

recording means for recording an engine vibration detection signal of the vibration detecting means and the rotation angles of the crank shaft detected by the first rotation angle detecting means and the cam shaft detected by the second rotation angle detecting means; and an engine failure detector for extracting a tappet sound of the engine from the vibration detection signal recorded in the recording means by a wavelet transform such that any plural number of samples of the expansion factors of the wavelet transform are averaged, thereby detecting a cylinder valve at which an abnormality has occurred by the rotation angles of the crank shaft and the cam shaft obtained when the tappet sound of the engine has been extracted.

3. A failure diagnosis system for automobile engines as set forth in claim 1 or 2, wherein the system is installed during the fabrication process of the engine.

* * * * *